(12) United States Patent  
Lai

(10) Patent No.: US 8,547,649 B2  
(45) Date of Patent: Oct. 1, 2013

(54) FIVE-PIECE OPTICAL LENS SYSTEM

(75) Inventor: Shu-Tzu Lai, Taichung (TW)

(73) Assignee: Newmax Technology Co., Ltd., Taichung (TW)

( * ) Notice: Subject to any disclaimer, the term of this patent is extended or adjusted under 35 U.S.C. 154(b) by 19 days.

(21) Appl. No.: 13/339,360

(22) Filed: Dec. 28, 2011

(65) Prior Publication Data

US 2013/0170048 A1 Jul. 4, 2013

(51) Int. Cl.
*G02B 9/60* (2006.01)
*G02B 13/18* (2006.01)
*G02B 3/02* (2006.01)

(52) U.S. Cl.
USPC .......................................... 359/764; 359/714

(58) Field of Classification Search
USPC .................. 359/764, 763, 714, 649
See application file for complete search history.

(56) References Cited

U.S. PATENT DOCUMENTS

| 2011/0188131 A1* | 8/2011 | Sano | 359/714 |
| 2011/0310287 A1* | 12/2011 | Ohtsu | 348/340 |
| 2012/0087020 A1* | 4/2012 | Tang et al. | 359/714 |

* cited by examiner

*Primary Examiner* — Alicia M Harrington

(57) ABSTRACT

A five-piece optical lens system is provided with, in order from the object side to the image side: a stop, a first lens element with a positive refractive power having a convex image-side surface, one of the object-side surface and an image-side surface being aspheric; a second lens element with a negative refractive power having a concave image-side surface, one of the object-side surface and an image-side surface being aspheric; a third lens element with a positive refractive power having a convex image-side surface, one of an object-side surface and the image-side surface being aspheric; a fourth lens element having a concave object-side surface, one of the object-side surface and an image-side surface being aspheric; a fifth lens element with a negative refractive power having a convex image-side surface, one of an object-side surface and the image-side surface being aspheric.

12 Claims, 8 Drawing Sheets

FIVE-PIECE OPTICAL LENS SYSTEM

BACKGROUND OF THE INVENTION

1. Field of the Invention

The present invention relates to an optical lens system, and more particularly to a five-piece optical lens system.

2. Description of the Prior Art

In recent years, with the popularity of the mobile phone cameras, the optical lens system has become smaller in size, and the electronic sensor of a general digital camera is typically a CCD (Charge Coupled Device) or CMOS (Complementary Metal Oxide Semiconductor) sensor. Due to advances in semiconductor manufacturing, the pixel size of sensor has been reduced continuously, and miniaturized optical lens systems have increasingly higher resolution. Therefore, there's an increasing demand for an imaging lens system with better image quality.

Conventional miniaturized lens systems used in portable electronic products mostly consist of four lens elements, however, the resolution of the mobile phone camera has been improved rapidly. As the pixel size of electronic imaging sensors gradually becomes smaller and smaller, the system requires higher image quality, and miniaturization and high performance have become the trend of modern electronic products. The conventional optical lens system comprising four lens elements cannot satisfy the requirements of higher resolution optical lens systems.

The present invention mitigates and/or obviates the aforementioned disadvantages.

SUMMARY OF THE INVENTION

The primary objective of the present invention is to provide a five-piece optical lens system capable of being applied to the electronic imaging sensors with high pixel sizes without make the total track length of the optical lens system too long.

A five-piece optical lens system in accordance with the present invention comprises, in order from the object side to the image side: a stop; a first lens element with a positive refractive power having a convex image-side surface, at least one of an object-side and the image-side surfaces of the first lens element being aspheric; a second lens element with a negative refractive power having a concave image-side surface, at least one of an object-side and the image-side surfaces of the second lens element being aspheric; a third lens element with a positive refractive power having a convex image-side surface, at least one of an object-side and the image-side surfaces of the third lens element being aspheric; a fourth lens element having a concave object-side surface, at least one of the object-side and an image-side surfaces of the fourth lens element being aspheric; a fifth lens element with a negative refractive power having a convex image-side surface, at least one of an object-side and the image-side surfaces of the fifth lens element being aspheric.

According to one aspect of the present invention five-piece optical lens system, the focal length of the first lens element is f1, the focal length of the second lens element is f2, and they satisfy the relation: $0.3<|f1|/|f2|<1.0$. If $|f1|/|f2|$ satisfies the above relation, a wide field of view can be provided and the resolution can be improved evidently. Contrarily, If $||f1|/|f2|$ exceeds the above range, the performance and resolution of the optical lens system with a wide field of view will be reduced, and the yield rate will be low.

According to another aspect of the present invention five-piece optical lens system, the focal length of the second lens element is f2, the focal length of the third lens element is f3, and they satisfy the relation: $0.5<|f2|/|f3|<2.2$. If $|f2|/|f3|$ satisfies the above relation, a wide field of view can be provided and the resolution can be improved evidently. Contrarily, If $|f2|/|f3|$ exceeds the above range, the performance and resolution of the optical lens system with a wide field of view will be reduced, and the yield rate will be low.

According to another aspect of the present invention five-piece optical lens system, the focal length of the third lens element is f3, the focal length of the fourth lens element is f4, and they satisfy the relation: $|f3|/|f4|<1.2$. If $|f3|/|f4|$ satisfies the above relation, a wide field of view can be provided and the resolution can be improved evidently. Contrarily, If $|f3|/|f4|$ exceeds the above range, the performance and resolution of the optical lens system with a wide field of view will be reduced, and the yield rate will be low.

According to another aspect of the present invention five-piece optical lens system, the focal length of the fourth lens element is f4, the focal length of the fifth lens element is f5, and they satisfy the relation: $1.0<|f4|/|f5|<5.5$. If $|f4|/|f5|$ satisfies the above relation, a wide field of view can be provided and the resolution can be improved evidently. Contrarily, If $|f4|/|f5|$ exceeds the above range, the performance and resolution of the optical lens system with a wide field of view will be reduced, and the yield rate will be low.

According to another aspect of the present invention five-piece optical lens system, the refractive index of the second lens element is N2, the Abbe number of the second lens element is V2, and they satisfy the relations: $N2>1.57$; $V2<40$. If N2 and V2 satisfy the above relations, the volume of the optical lens system can be reduced and the edge of an image can be effectively flattened, thus improving the image quality of the periphery of the image (namely, the limb darkening). In addition, the arrangement of the lens elements can make the optical lens system have a relatively short total track length and provide enough space for the IR cut filter.

According to another aspect of the present invention five-piece optical lens system, the focal length of the first lens element is f1, the focal length of the second lens element, the third lens element, the fourth lens element and the fifth lens element combined is f2345, and they satisfy the relation: $|f1|/|f2345|<1.1$. If $|f1|/|f2345|$ satisfies the above relation, a wide field of view can be provided and the resolution can be improved evidently. Contrarily, If $|f1|/|f2345|$ exceeds the above range, the performance and resolution of the optical lens system with a wide field of view will be reduced, and the yield rate will be low.

According to another aspect of the present invention five-piece optical lens system, the focal length of the first lens element and the second lens element combined is f12, the focal length of the third lens element, the fourth lens element and the fifth lens element combined is f345, and they satisfy the relation: $|f12|/|f345|<2.5$. If $|f12|/|f345|$ satisfies the above relation, a wide field of view can be provided and the resolution can be improved evidently. Contrarily, If $|f12|/|f345|$ exceeds the above range, the performance and resolution of the optical lens system with a wide field of view will be reduced, and the yield rate will be low.

According to another aspect of the present invention five-piece optical lens system, the focal length of the first lens element, the second lens element and the third lens element combined is f123, the focal length of the fourth lens element and the fifth lens element combined is f45, and they satisfy the relation: $|f123|/|f45|<1.2$. If $|f123|/|f45|$ satisfies the above relation, a wide field of view can be provided and the resolution can be improved evidently. Contrarily, If $|f123|/|f45|$ exceeds the above range, the performance and resolution of the optical lens system with a wide field of view will be reduced, and the yield rate will be low.

According to another aspect of the present invention five-piece optical lens system, the focal length of the five-piece optical lens system is f, the distance between the object-side surface of the first lens element and the image plane is TL, and they satisfy the relation: $0.5<|f/TL|<0.9$. If $|f/TL|$ satisfies the above relation, the total track length of the optical lens system can be relatively short, and the requirement of miniaturization can be satisfied.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
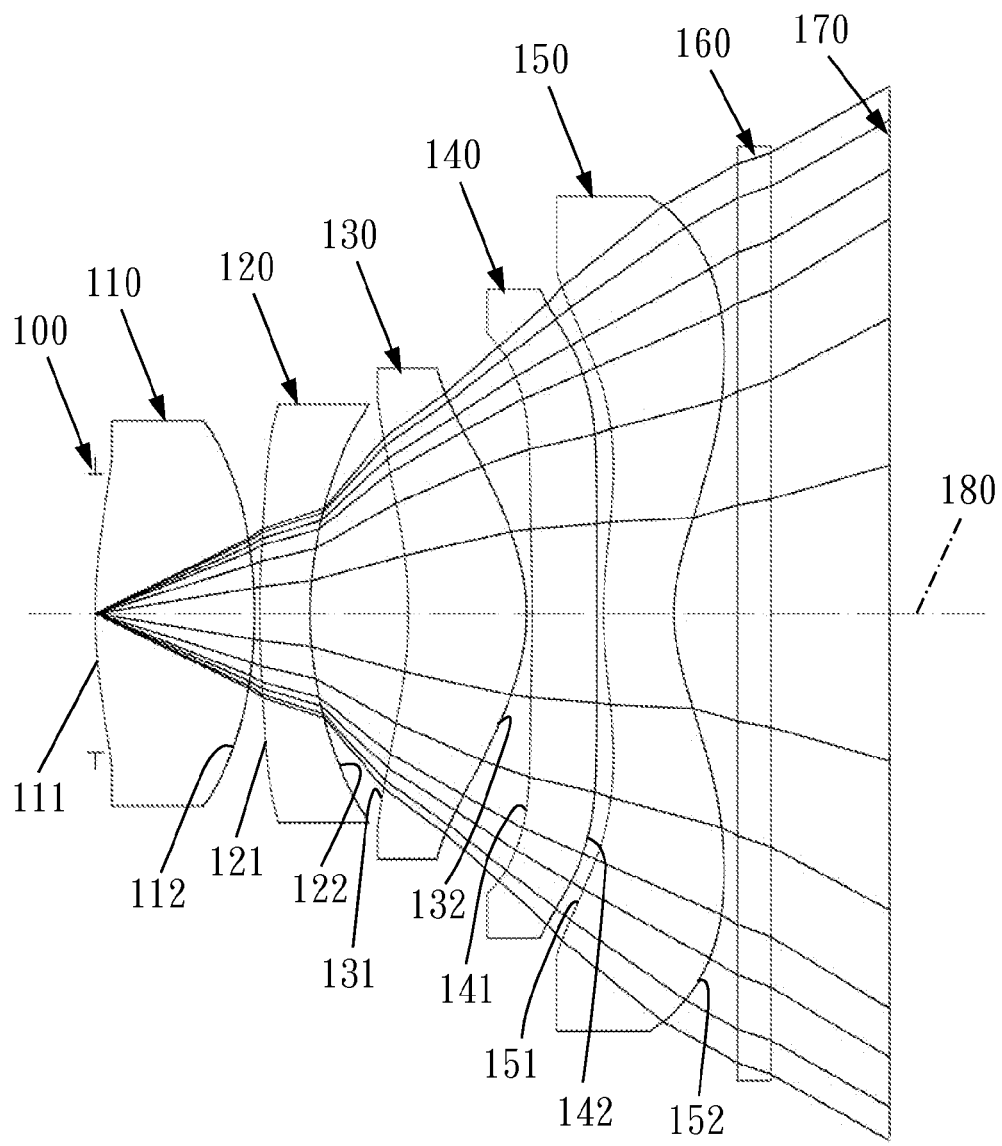
FIG. 1A shows an optical lens system in accordance with a first embodiment of the present invention.
Figure 1B:
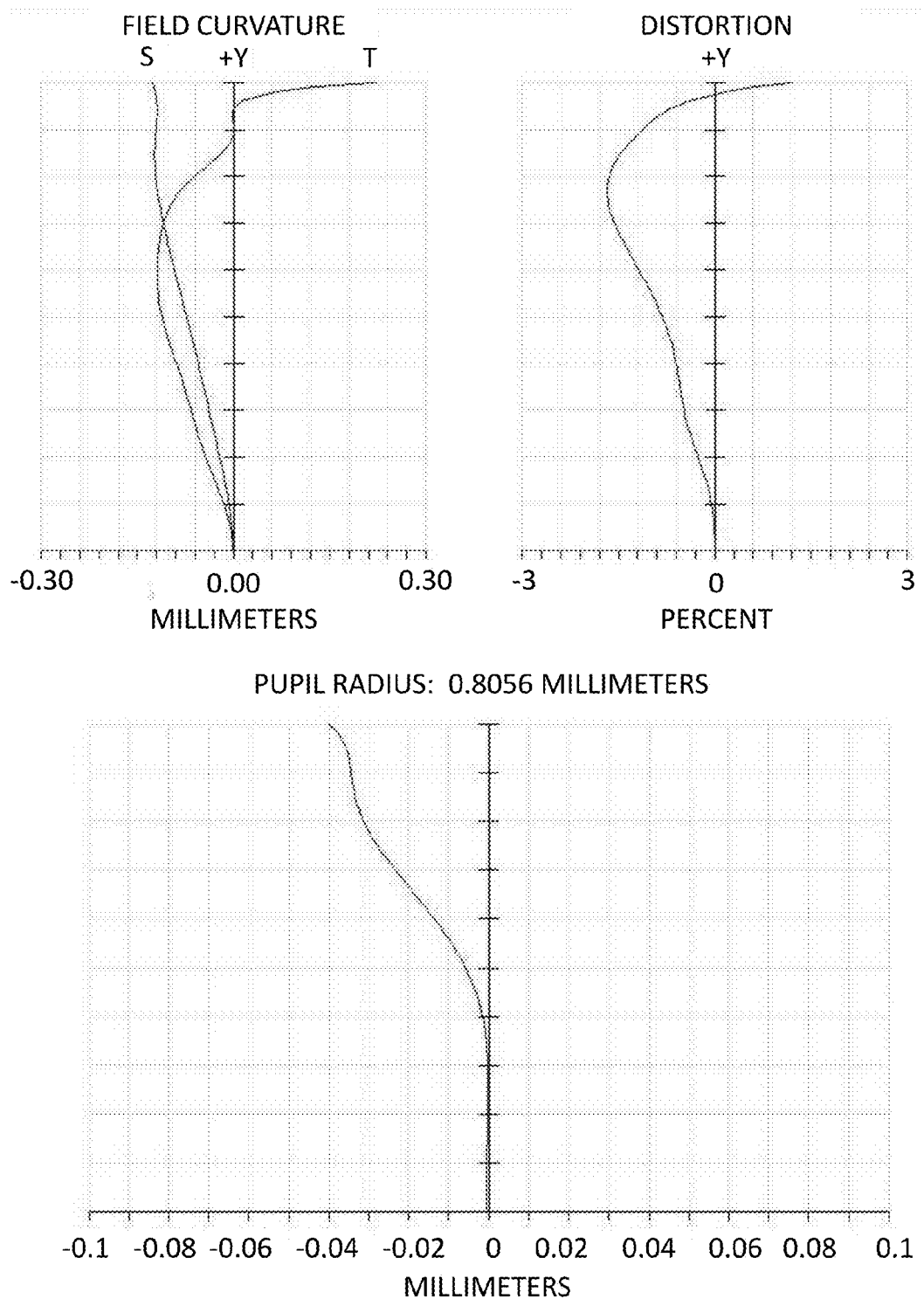
FIG. 1B shows the longitudinal spherical aberration curve, the astigmatic field curve, and the distortion curve of the first embodiment of the present invention.

Referring to FIG. 1A, which shows a five-piece optical lens system in accordance with a first embodiment of the present invention, and FIG. 1B shows the longitudinal spherical aberration curves, the astigmatic field curves, and the distortion curve of the first embodiment of the present invention. A five-piece optical lens system in accordance with the first embodiment of the present invention comprises, in order from the object side A to the image side B:

A stop 100.

A first lens element 110 with a positive refractive power made of plastic has a convex object-side surface 111 and a convex image-side surface 112, and the object-side surface 111 and the image-side surface 112 of the first lens element 110 are aspheric.

A second lens element 120 with a negative refractive power made of plastic has a convex object-side surface 121 and a concave image-side surface 122, and the object-side surface 121 and the image-side surface 122 of the second lens element 120 are aspheric.

A third lens element 130 with a positive refractive power made of plastic has a concave object-side surface 131 and a convex image-side surface 132, and the object-side surface 131 and the image-side surface 132 of the third lens element 130 are aspheric.

A fourth lens element 140 with a negative refractive power made of plastic has a concave object-side surface 141 and a convex image-side surface 142, and the object-side surface 141 and the image-side surface 142 of the fourth lens element 140 are aspheric.

A fifth lens element 150 with a negative refractive power made of plastic has a convex object-side surface 151 and a concave image-side surface 152, and the object-side surface 151 and the image-side surface 152 of the fifth lens element 150 are aspheric.

An IR cut filter 160 made of glass is located between the image-side surface 152 of the fifth lens element 150 and an image plane 170 and has no influence on the focal length of the five-piece optical lens system.

The equation for the aspheric surface profiles of the first embodiment is expressed as follows:

$$z = \frac{ch^2}{1 + [1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 180 k represents the conic constant;

c represents the reciprocal of the radius of curvature;

A, B, C, D, E, G, . . . : represent the high-order aspheric coefficients.

In the first embodiment of the present optical lens system, the focal length of the five-piece optical lens system is f, and it satisfies the relation:

$f=3.69$.

In the first embodiment of the present five-piece optical lens system, the f-number of the five-piece optical lens system is Fno, and it satisfies the relation:

$Fno=2.2$.

In the first embodiment of the present five-piece optical lens system, the field of view of the optical lens system is 2ω, and it satisfies the relation:

$2\omega=75°$.

In the first embodiment of the present five-piece optical lens system, the refractive index of the second lens element 120 is N2, the Abbe number of the second lens element 120 is V2, and they satisfy the relations:

$N2=1.632$;

$V2=23$.

In the first embodiment of the present five-piece optical lens system, the focal length of the first lens element 110 is f1, the focal length of the second lens element 120 is f2, and they satisfy the relation:

$|f1|/|f2|=0.5141$.

In the first embodiment of the present five-piece optical lens system, the focal length of the second lens element 120 is f2, the focal length of the third lens element 130 is f3, and they satisfy the relation:

$|f2|/|f3|=1.8163$.

In the first embodiment of the present five-piece optical lens system, the focal length of the third lens element 130 is f3, the focal length of the fourth lens element 140 is f4, and they satisfy the relation:

$|f3|/|f4|=0.2049$.

In the first embodiment of the present five-piece optical lens system, the focal length of the fourth lens element 140 is f4, the focal length of the fifth lens element 150 is f5, and they satisfy the relation:

$|f4|/|f5|=3.9554$.

In the first embodiment of the present five-piece optical lens system, the focal length of the first lens element 110 is f1, the focal length of the second lens element 120, the third lens element 130, the fourth lens element 140 and the fifth lens element 150 combined is f2345, and they satisfy the relation:

$|f1|/|f2345|=0.5012.$

In the first embodiment of the present five-piece optical lens system, the focal length of the first lens element 110 and the second lens element 120 combined is f12, the focal length of the third lens element 130, the fourth lens element 140 and the fifth lens element 150 combined is f345, and they satisfy the relation:

$|f12|/|f345|=0.1175.$

In the first embodiment of the present five-piece optical lens system, the focal length of the first lens element 110, the second lens element 120 and the third lens element 130 combined is f123, the focal length of the fourth lens element 140 and the fifth lens element 150 combined is f45, and they satisfy the relation:

$|f123|/|f45|=0.9422.$

In the first embodiment of the present five-piece optical lens system, the focal length of the five-piece optical lens system is f, the distance between the object-side surface 111 of the first lens element 110 and the image plane 170 is TL, and they satisfy the relation:

$|f/TL|=0.7432.$

The detailed optical data of the first embodiment is shown in table 1, and the aspheric surface data is shown in table 2, wherein the units of the radius of curvature, the thickness and the focal length are expressed in mm. In the tables 1 and 2, the surfaces 2 and 3 represent the object-side surface 111 and the image-side surface 112 of the first lens element 110, respectively, the surfaces 4 and 5 represent the object-side surface 121 and the image-side surface 122 of the second lens element 120, respectively, the surfaces 6 and 7 represent the object-side surface 131 and the image-side surface 132 of the third lens element 130, respectively, the surfaces 8 and 9 represent the object-side surface 141 and the image-side surface 142 of the fourth lens element 140, respectively, and the surfaces 10 and 11 represent the object-side surface 151 and the image-side surface 152 of the fifth lens element 150, respectively.

TABLE 1

(Embodiment 1)
f(focal length) = 3.69 mm, Fno = 2.2, 2ω = 75°.

| Surface # | | Curvature Radius | Thickness | Material | nd | vd |
|---|---|---|---|---|---|---|
| 0 | Object | Infinity | Infinity | | | |
| 1 | Stop | Infinity | 0 | | | |
| 2 | Lens 1 | 2.845499(ASP) | 0.997785 | Plastic | 1.535 | 56 |
| 3 | | −2.69737(ASP) | 0.031718 | | | |
| 4 | Lens 2 | 4.709608(ASP) | 0.314456 | Plastic | 1.632 | 23 |
| 5 | | 1.928305(ASP) | 0.615746 | | | |
| 6 | Lens 3 | −2.42354(ASP) | 0.740778 | Plastic | 1.535 | 56 |
| 7 | | −1.05964(ASP) | 0.034467 | | | |
| 8 | Lens 4 | −7.75401(ASP) | 0.406171 | Plastic | 1.632 | 23 |
| 9 | | −51.0272(ASP) | 0.041449 | | | |
| 10 | Lens 5 | 1.901796(ASP) | 0.439878 | Plastic | 1.535 | 56 |
| 11 | | 0.885483(ASP) | 0.40108 | | | |
| 12 | IR-filter | Infinity | 0.21 | Glass | 1.5168 | 64.167336 |
| 13 | | Infinity | 0.73961 | | | |
| 14 | Image | Infinity | | | | |

TABLE 2

Aspheric Coefficients

| Surface # | 2 | 3 | 4 | 5 | 6 |
|---|---|---|---|---|---|
| k = | −5.55074 | 0.954687 | 11.89479 | −1.77103 | −8.48652 |
| A = | −0.011793128 | −0.083408296 | −0.14644683 | −0.035648 | −0.008497149 |
| B = | −0.008997465 | 0.095396616 | 0.103507 | 0.001351734 | 0.039390254 |
| C = | −0.035703717 | −0.054189771 | −0.004745912 | 0.042839424 | −0.023223567 |
| D = | 0.01 | 0.002863388 | −0.013769836 | −0.015519036 | 0.005723045 |

| Surface # | 7 | 8 | 9 | 10 | 11 |
|---|---|---|---|---|---|
| k = | −2.80434 | −983.984 | 678.4531 | −36.9833 | −5.76633 |
| A = | 0.00171236 | 0.0365087 | 0.0285167 | −0.06893151 | −0.065707402 |
| B = | −0.021513569 | −0.039028705 | −0.031668274 | 0.00010119 | 0.014496323 |
| C = | 0.021212353 | 0.007040743 | 0.003283609 | 0.00324649 | −0.001738823 |
| D = | −0.00356209 | −0.000934125 | 0.000413163 | −0.000308073 | 4.28E−05 |

Figure 2A:
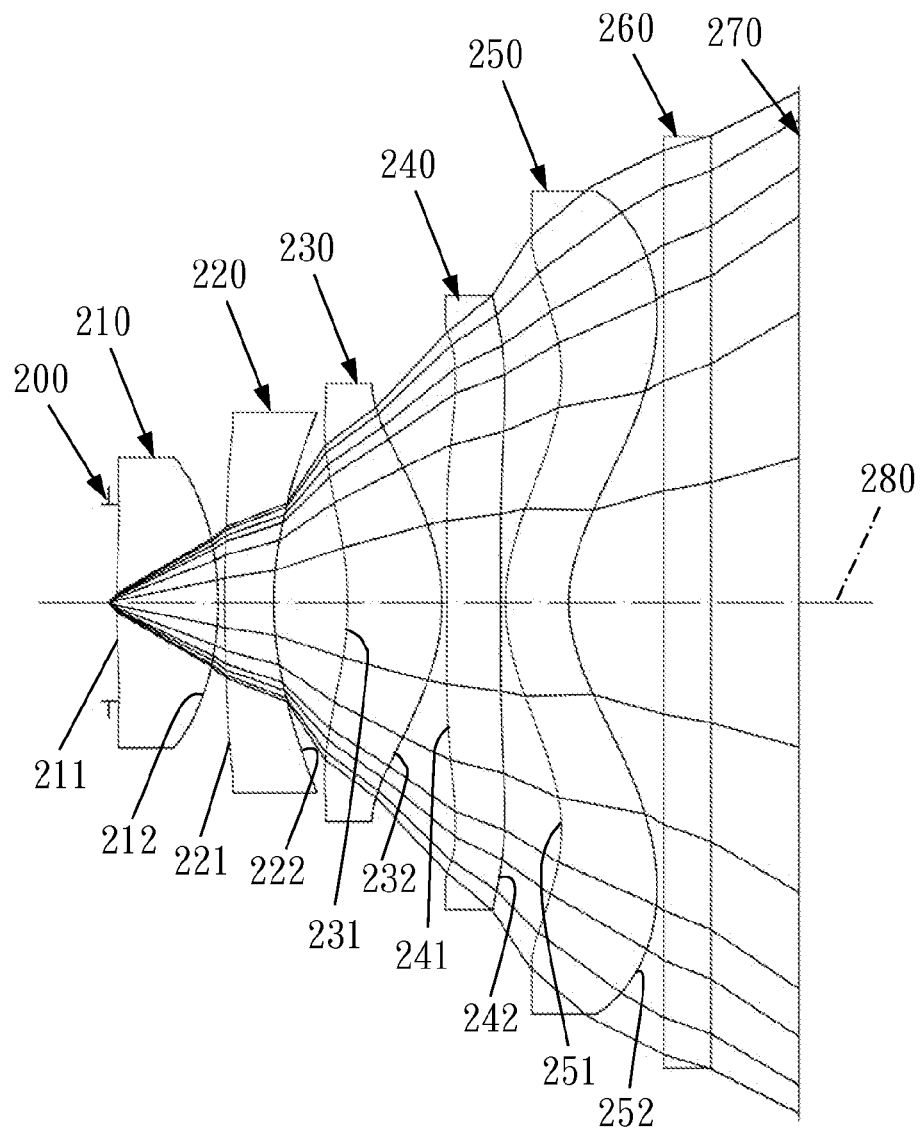
FIG. 2A shows an optical lens system in accordance with a second embodiment of the present invention.
Figure 2B:
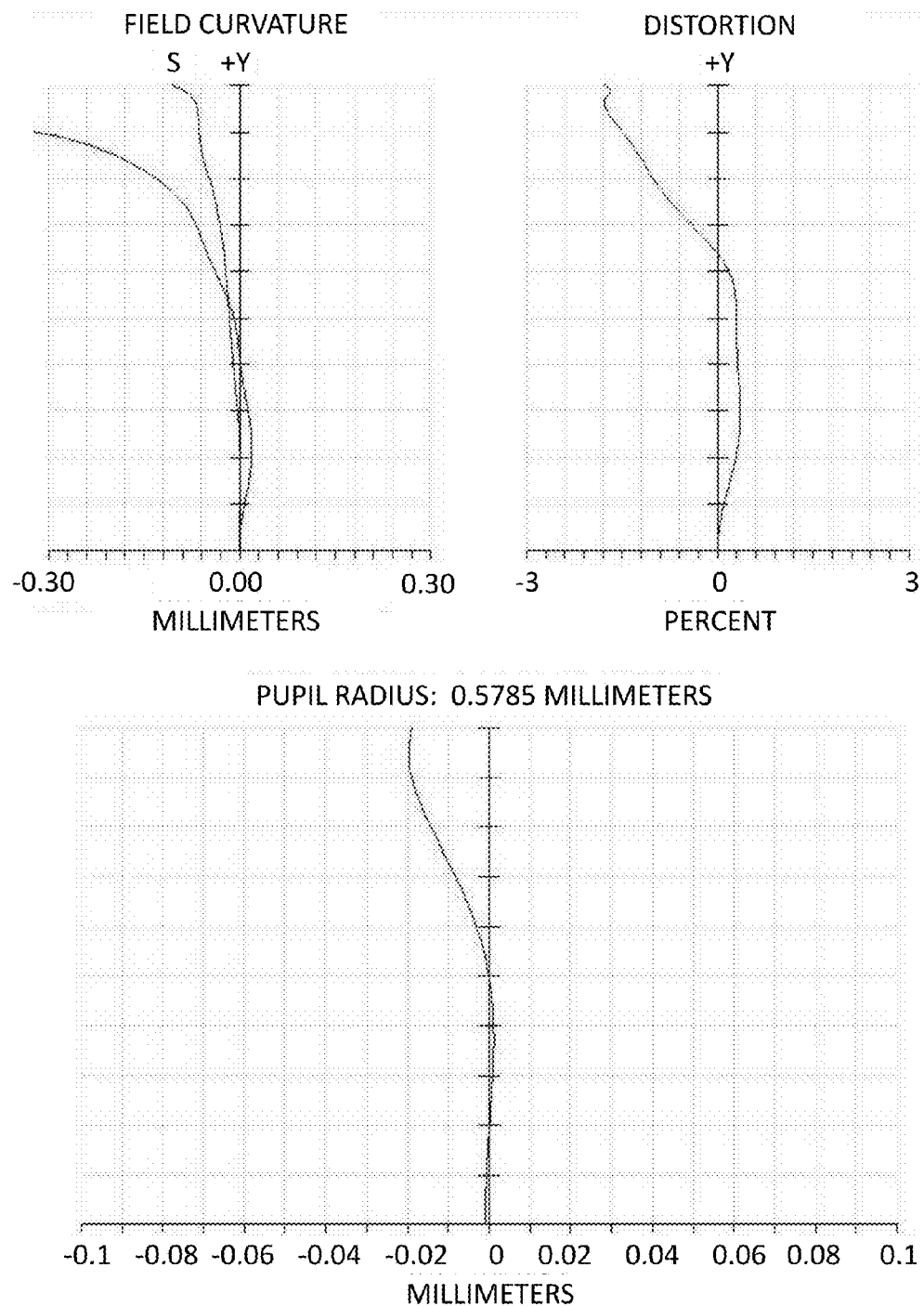
FIG. 2B shows the longitudinal spherical aberration curve, the astigmatic field curve, and the distortion curve of the second embodiment of the present invention.

Referring to FIG. 2A, which shows a five-piece optical lens system in accordance with a second embodiment of the present invention, and FIG. 2B shows the longitudinal spherical aberration curves, the astigmatic field curves, and the distortion curve of the second embodiment of the present invention. The second embodiment of the present invention comprises, in order from the object side A to the image side B:

A stop 200.

A first lens element 210 with a positive refractive power made of plastic has a convex object-side surface 211 and a convex image-side surface 212, and the object-side surface 211 and the image-side surface 212 of the first lens element 210 are aspheric.

A second lens element 220 with a negative refractive power made of plastic has a convex object-side surface 221 and a concave image-side surface 222, and the object-side surface 221 and the image-side surface 222 of the second lens element 220 are aspheric.

A third lens element 230 with a positive refractive power made of plastic has a concave object-side surface 231 and a convex image-side surface 232, and the object-side surface 231 and the image-side surface 232 of the third lens element 230 are aspheric.

A fourth lens element 240 with a negative refractive power made of plastic has a concave object-side surface 241 and a convex image-side surface 242, and the object-side surface 241 and the image-side surface 242 of the fourth lens element 240 are aspheric.

A fifth lens element 250 with a negative refractive power made of plastic has a convex object-side surface 251 and a concave image-side surface 252, and the object-side surface 251 and the image-side surface 252 of the fifth lens element 250 are aspheric.

An IR cut filter 260 made of glass is located between the image-side surface 252 of the fifth lens element 250 and an image plane 270 and has no influence on the focal length of the five-piece optical lens system.

The equation for the aspheric surface profiles of the second embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 280;

k represents the conic constant;

c represents the reciprocal of the radius of curvature;

A, B, C, D, E, G, . . . : represent the high-order aspheric coefficients.

In the second embodiment of the present five-piece optical lens system, the focal length of the five-piece optical lens system is f, and it satisfies the relation:

$f=2.86$.

In the second embodiment of the present five-piece optical lens system, the f-number of the five-piece optical lens system is Fno, and it satisfies the relation:

$Fno=2.4$.

In the second embodiment of the present five-piece optical lens system, the field of view of the five-piece optical lens system is 2ω, and it satisfies the relation:

$2\omega=90°$.

In the second embodiment of the present five-piece optical lens system, the refractive index of the second lens element 220 is N2, the Abbe number of the second lens element 220 is V2, and they satisfy the relations:

$N2=1.632$;

$V2=23$.

In the second embodiment of the present five-piece optical lens system, the focal length of the first lens element 210 is f1, the focal length of the second lens element 220 is f2, and they satisfy the relation:

$|f1|/|f2|=0.5715$.

In the second embodiment of the present five-piece optical lens system, the focal length of the second lens element 220 is f2, the focal length of the third lens element 230 is f3, and they satisfy the relation:

$|f2|/|f3|=1.0748$.

In the second embodiment of the present five-piece optical lens system, the focal length of the third lens element 230 is f3, the focal length of the fourth lens element 240 is f4, and they satisfy the relation:

$|f3|/|f4|=0.0627$.

In the second embodiment of the present five-piece optical lens system, the focal length of the fourth lens element 240 is f4, the focal length of the fifth lens element 250 is f5, and they satisfy the relation:

$|f4|/|f5|=5.4373$.

In the second embodiment of the present five-piece optical lens system, the focal length of the first lens element 210 is f1, the focal length of the second lens element 220, the third lens element 230, the fourth lens element 240 and the fifth lens element 250 combined is f2345, and they satisfy the relation:

$|f1|/|f2345|=0.0890$.

In the second embodiment of the present five-piece optical lens system, the focal length of the first lens element 210 and the second lens element 220 combined is f12, the focal length of the third lens element 230, the fourth lens element 240 and the fifth lens element 250 combined is f345, and they satisfy the relation:

$|f12|/|f345|=0.8478$.

In the second embodiment of the present five-piece optical lens system, the focal length of the first lens element 210, the second lens element 220 and the third lens element 230 combined is f123, the focal length of the fourth lens element 240 and the fifth lens element 250 combined is f45, and they satisfy the relation:

$|f123|/|f45|=0.2889$.

In the second embodiment of the present five-piece optical lens system, the focal length of the five-piece optical lens system is f, the distance between the object-side surface 211 of the first lens element 210 and the image plane 270 is TL, and they satisfy the relation:

$|f/TL|=0.6526$.

The detailed optical data of the second embodiment is shown in table 3, and the aspheric surface data is shown in table 4, wherein the units of the radius of curvature, the thickness and the focal length are expressed in mm. In the tables 3 and 4, the surfaces 2 and 3 represent the object-side surface 211 and the image-side surface 212 of the first lens element 210, respectively, the surfaces 4 and 5 represent the object-side surface 221 and the image-side surface 222 of the second lens element 220, respectively, the surfaces 6 and 7 represent the object-side surface 231 and the image-side surface 232 of the third lens element 230, respectively, the surfaces 8 and 9 represent the object-side surface 241 and the image-side surface 242 of the fourth lens element 240, respectively, and the surfaces 10 and 11 represent the object-side surface 251 and the image-side surface 252 of the fifth lens element 250, respectively.

TABLE 3

(Embodiment 2)
f(focal length) = 2.86 mm, Fno = 2.4, 2ω = 90°.

| Surface # | | Curvature Radius | Thickness | Material | nd | vd |
|---|---|---|---|---|---|---|
| 0 | Object | Infinity | Infinity | | | |
| 1 | Stop | Infinity | 0 | | | |
| 2 | Lens 1 | 5.302978(ASP) | 0.643614 | Plastic | 1.535 | 56 |
| 3 | | −1.7093(ASP) | 0.039299 | | | |
| 4 | Lens 2 | 5.376636(ASP) | 0.314262 | Plastic | 1.632 | 23 |
| 5 | | 1.789442(ASP) | 0.4664 | | | |
| 6 | Lens 3 | −1.80154(ASP) | 0.601153 | Plastic | 1.535 | 56 |
| 7 | | −1.10007(ASP) | 0.032245 | | | |
| 8 | Lens 4 | −21.0133(ASP) | 0.339737 | Plastic | 1.531 | 56 |
| 9 | | −54.2549(ASP) | 0.033159 | | | |
| 10 | Lens 5 | 1.077954(ASP) | 0.401075 | Plastic | 1.535 | 56 |
| 11 | | 0.802195(ASP) | 0.602516 | | | |
| 12 | IR-filter | Infinity | 0.3 | Glass | 1.5168 | 64.167336 |
| 13 | | Infinity | 0.559663 | | | |
| 14 | Image | Infinity | | | | |

TABLE 4

Aspheric Coefficients

| Surface # | 2 | 3 | 4 | 5 | 6 |
|---|---|---|---|---|---|
| k = | −41.4247 | 2.269337 | 9.09726 | −4.006414 | −6.610414 |
| A = | −0.07333 | −0.029 | −0.16214 | −0.03565 | 0.015736 |
| B = | −0.12601 | 0.072435 | 0.128747 | 0.015702 | 0.077466 |
| C = | −0.00675 | 0.008939 | 0.033801 | 0.029103 | −0.02719 |
| D = | −0.12047 | 0.002318 | −0.05082 | −0.01822 | −4.95E−05 |

| Surface # | 7 | 8 | 9 | 10 | 11 |
|---|---|---|---|---|---|
| k = | −2.54577 | 158.8585 | 795.8416 | −1.89099 | −2.26909 |
| A = | −0.02006 | 0.104513 | 0.056716 | −0.10487 | −0.08117 |
| B = | −0.0025 | −0.05751 | −0.02952 | 0.000611 | 0.011376 |
| C = | 0.035194 | 0.012452 | 0.00253 | 0.003743 | −0.00043 |
| D = | −0.008 | −0.00147 | 0.000352 | −0.00035 | −6.37E−05 |

Figure 3A:
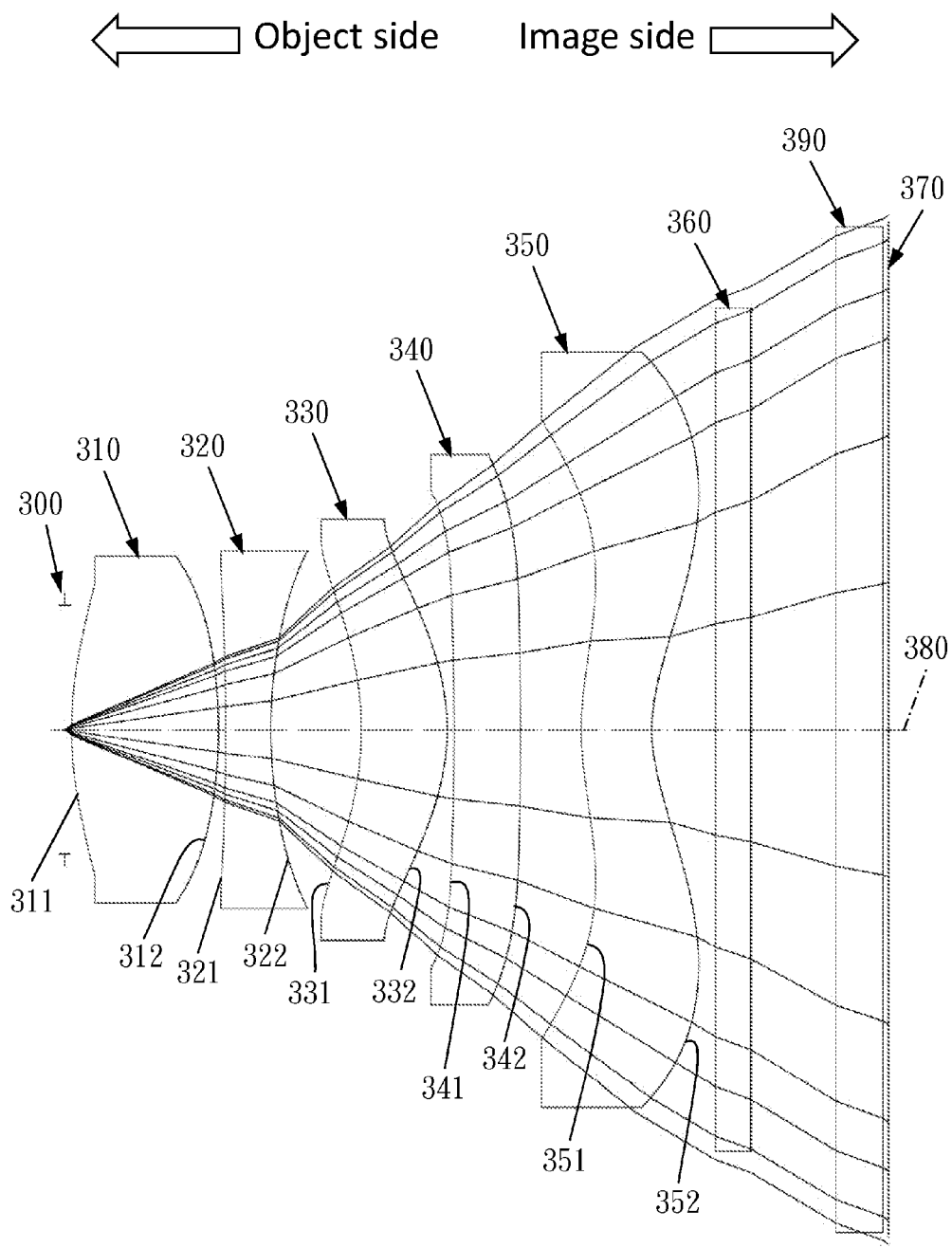
FIG. 3A shows an optical lens system in accordance with a third embodiment of the present invention.
Figure 3B:
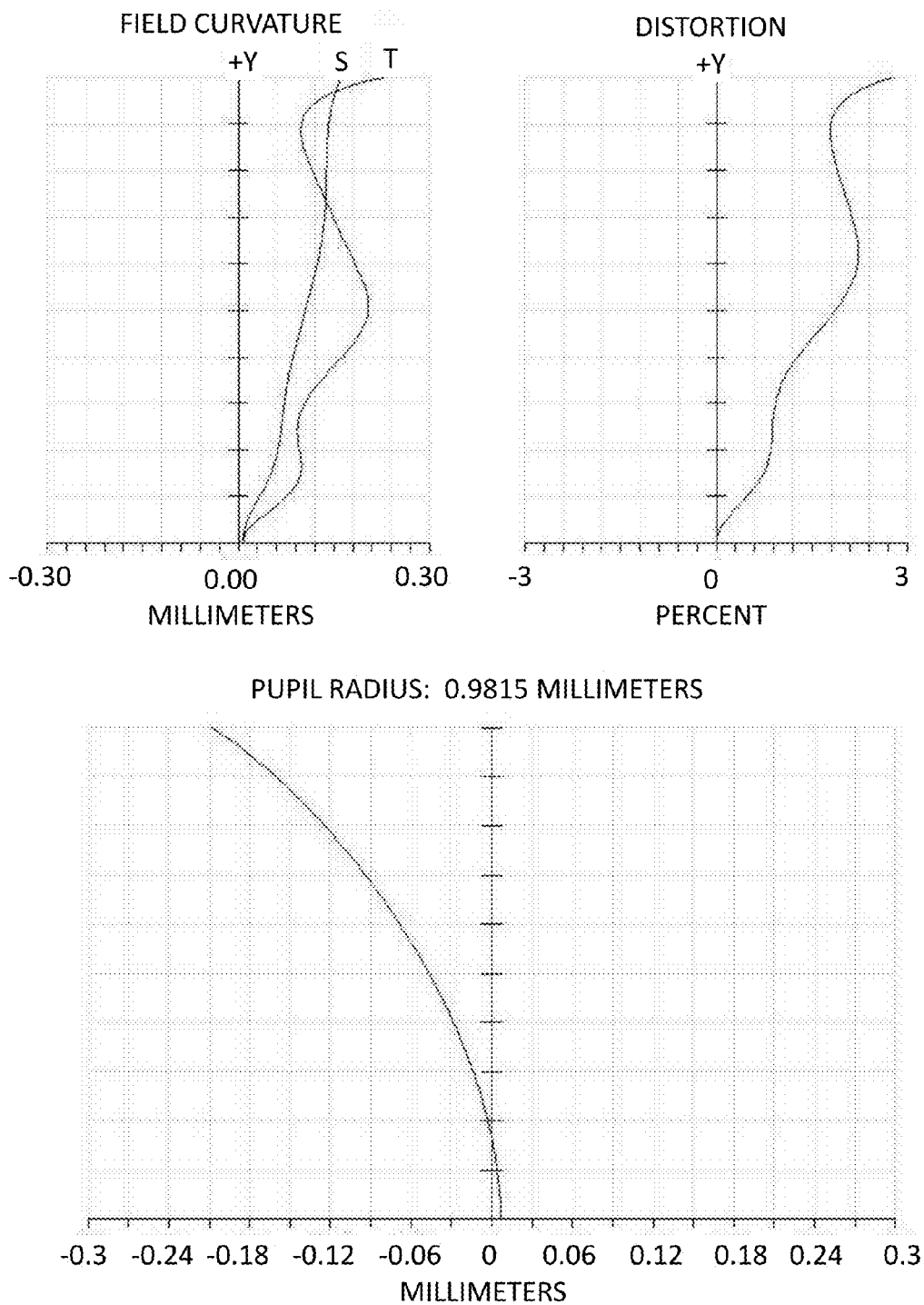
FIG. 3B shows the longitudinal spherical aberration curve, the astigmatic field curve, and the distortion curve of the third embodiment of the present invention.

Referring to FIG. 3A, which shows a five-piece optical lens system in accordance with a third embodiment of the present invention, and FIG. 3B shows the longitudinal spherical aberration curves, the astigmatic field curves, and the distortion curve of the third embodiment of the present invention. The third embodiment of the present invention comprises, in order from the object side A to the image side B:

A stop 300.

A first lens element 310 with a positive refractive power made of plastic has a convex object-side surface 311 and a convex image-side surface 312, and the object-side surface 311 and the image-side surface 312 of the first lens element 310 are aspheric.

A second lens element 320 with a negative refractive power made of plastic has a concave object-side surface 321 and a concave image-side surface 322, and the object-side surface 321 and the image-side surface 322 of the second lens element 320 are aspheric.

A third lens element 330 with a positive refractive power made of plastic has a concave object-side surface 331 and a convex image-side surface 332, and the object-side surface 331 and the image-side surface 332 of the third lens element 330 are aspheric.

A fourth lens element 340 with a negative refractive power made of plastic has a concave object-side surface 341 and a convex image-side surface 342, and the object-side surface 341 and the image-side surface 342 of the fourth lens element 340 are aspheric.

A fifth lens element 350 with a negative refractive power made of plastic has a convex object-side surface 351 and a concave image-side surface 352, and the object-side surface 351 and the image-side surface 352 of the fifth lens element 350 are aspheric.

An IR cut filter 360 made of glass is located between the image-side surface 352 of the fifth lens element 350 and an image plane 370 and has no influence on the focal length of the optical lens system.

A cover glass 390 made of glass is located between the IR cut filter 360 and the image plane 370 to protect a sensor (not shown), and has no influence on the focal length of the five-piece optical lens system.

The equation for the aspheric surface profiles of the third embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 380;

k represents the conic constant;

c represents the reciprocal of the radius of curvature;

A, B, C, D, E, G, . . . : represent the high-order aspheric coefficients.

In the third embodiment of the present five-piece optical lens system, the focal length of the five-piece optical lens system is f, and it satisfies the relation:

$f$=5.63.

In the third embodiment of the present five-piece optical lens system, the f-number of the five-piece optical lens system is Fno, and it satisfies the relation:

$Fno$=2.8.

In the third embodiment of the present five-piece optical lens system, the field of view of the five-piece optical lens system is 2ω, and it satisfies the relation:

2ω=68°.

In the third embodiment of the present five-piece optical lens system, the refractive index of the second lens element 320 is N2, the Abbe number of the second lens element 320 is V2, and they satisfy the relations:

$N2$=1.607;

$V2$=27.

In the third embodiment of the present five-piece optical lens system, the focal length of the first lens element 310 is f1, the focal length of the second lens element 320 is f2, and they satisfy the relation:

$|f1|/|f2|$=0.6079.

In the third embodiment of the present five-piece optical lens system, the focal length of the second lens element 320 is f2, the focal length of the third lens element 330 is f3, and they satisfy the relation:

$|f2|/|f3|$=0.6935.

In the third embodiment of the present five-piece optical lens system, the focal length of the third lens element 330 is f3, the focal length of the fourth lens element 340 is f4, and they satisfy the relation:

$|f3|/|f4|$=0.2579.

In the third embodiment of the present five-piece optical lens system, the focal length of the fourth lens element 340 is f4, the focal length of the fifth lens element 350 is f5, and they satisfy the relation:

$|f4|/|f5|$=3.8177.

In the third embodiment of the present five-piece optical lens system, the focal length of the first lens element 310 is f1, the focal length of the second lens element 320, the third lens element 330, the fourth lens element 340 and the fifth lens element 350 combined is f2345, and they satisfy the relation:

$|f1|/|f2345|$=0.7966.

In the third embodiment of the present five-piece optical lens system, the focal length of the first lens element 310 and the second lens element 320 combined is f12, the focal length of the third lens element 330, the fourth lens element 340 and the fifth lens element 350 combined is f345, and they satisfy the relation:

$|f12|/|f345|$=0.1362.

In the third embodiment of the present five-piece optical lens system, the focal length of the first lens element 310, the second lens element 320 and the third lens element 330 combined is f123, the focal length of the fourth lens element 340 and the fifth lens element 350 combined is f45, and they satisfy the relation:

$|f123|/|f45|$=0.7710.

In the third embodiment of the present five-piece optical lens system, the focal length of the five-piece optical lens system is f, the distance between the object-side surface 311 of the first lens element 310 and the image plane 370 is TL, and they satisfy the relation:

$|f/TL|$=0.8014.

The detailed optical data of the third embodiment is shown in table 5, and the aspheric surface data is shown in table 6, wherein the units of the radius of curvature, the thickness and the focal length are expressed in mm. In the tables 5 and 6, the surfaces 2 and 3 represent the object-side surface 311 and the image-side surface 312 of the first lens element 310, respectively, the surfaces 4 and 5 represent the object-side surface 321 and the image-side surface 322 of the second lens element 320, respectively, the surfaces 6 and 7 represent the object-side surface 331 and the image-side surface 332 of the third lens element 330, respectively, the surfaces 8 and 9 represent the object-side surface 341 and the image-side sur- face 342 of the fourth lens element 340, respectively, and the surfaces 10 and 11 represent the object-side surface 351 and the image-side surface 352 of the fifth lens element 350, respectively.

TABLE 5

(Embodiment 3)
f(focal length) = 5.63 mm, Fno = 2.8, 2ω = 68°.

| Surface # | | Curvature Radius | Thickness | Material | nd | vd |
|---|---|---|---|---|---|---|
| 0 | Object | Infinity | Infinity | | | |
| 1 | Stop | Infinity | 0.06 | | | |
| 2 | Lens 1 | 2.934507(ASP) | 1.251576 | Plastic | 1.531 | 56 |
| 3 | | −3.65097(ASP) | 0.057732 | | | |
| 4 | Lens 2 | −43.3973(ASP) | 0.387851 | Plastic | 1.607 | 27 |
| 5 | | 3.57248(ASP) | 0.77182 | | | |
| 6 | Lens 3 | −2.35536(ASP) | 0.73188 | Plastic | 1.514 | 57 |
| 7 | | −1.63916(ASP) | 0.06 | | | |
| 8 | Lens 4 | −13.3022(ASP) | 0.563425 | Plastic | 1.607 | 27 |

TABLE 5-continued (Embodiment 3)
f(focal length) = 5.63 mm, Fno = 2.8, 2ω = 68°.

| Surface # | | Curvature Radius | Thickness | Material | nd | vd |
|---|---|---|---|---|---|---|
| 9 | | −48.8062(ASP) | 0.518976 | | | |
| 10 | Lens 5 | 2.022648(ASP) | 0.602701 | Plastic | 1.531 | 56 |
| 11 | | 1.223396(ASP) | 0.542734 | | | |
| 12 | IR-filter | Infinity | 0.3 | Glass | 1.5168 | 64.167336 |
| 13 | | Infinity | 0.726281 | | | |
| 14 | Cover | Infinity | 0.4 | Glass | 1.5168 | 64.167336 |
| 15 | Glass | Infinity | 0.048205 | | | |
| 16 | Image | Infinity | | | | |

TABLE 6

Aspheric Coefficients

| Surface # | 2 | 3 | 4 | 5 | 6 |
|---|---|---|---|---|---|
| k = | −1.79007 | 1.014251 | −428.018 | −0.07654 | −1.02436 |
| A = | −0.00032 | −0.01208 | −0.01579 | −0.00687 | 0.003291 |
| B = | −0.00693 | −0.00579 | 0.004587 | 0.005291 | 0.004976 |
| C = | −8.09E−05 | −0.00022 | −0.00098 | 0.001016 | 0.002467 |
| D = | −0.00167 | −0.00027 | 0.000855 | −0.00019 | −9.62E−05 |

| Surface # | 7 | 8 | 9 | 10 | 11 |
|---|---|---|---|---|---|
| k = | −1.05811 | −839.609 | 404.1097 | −19.4234 | −6.13598 |
| A = | 0.031569 | 0.006125 | −0.00032 | −0.03519 | −0.02203 |
| B = | −0.00248 | −0.00524 | −0.00258 | 0.00092 | 0.001276 |
| C = | 0.000812 | 0.000187 | −4.13E−05 | 0.000291 | −3.48E−05 |
| D = | 0.000343 | −3.59E−05 | 4.00E−05 | −1.59E−05 | −2.40E−06 |

Figure 4A:
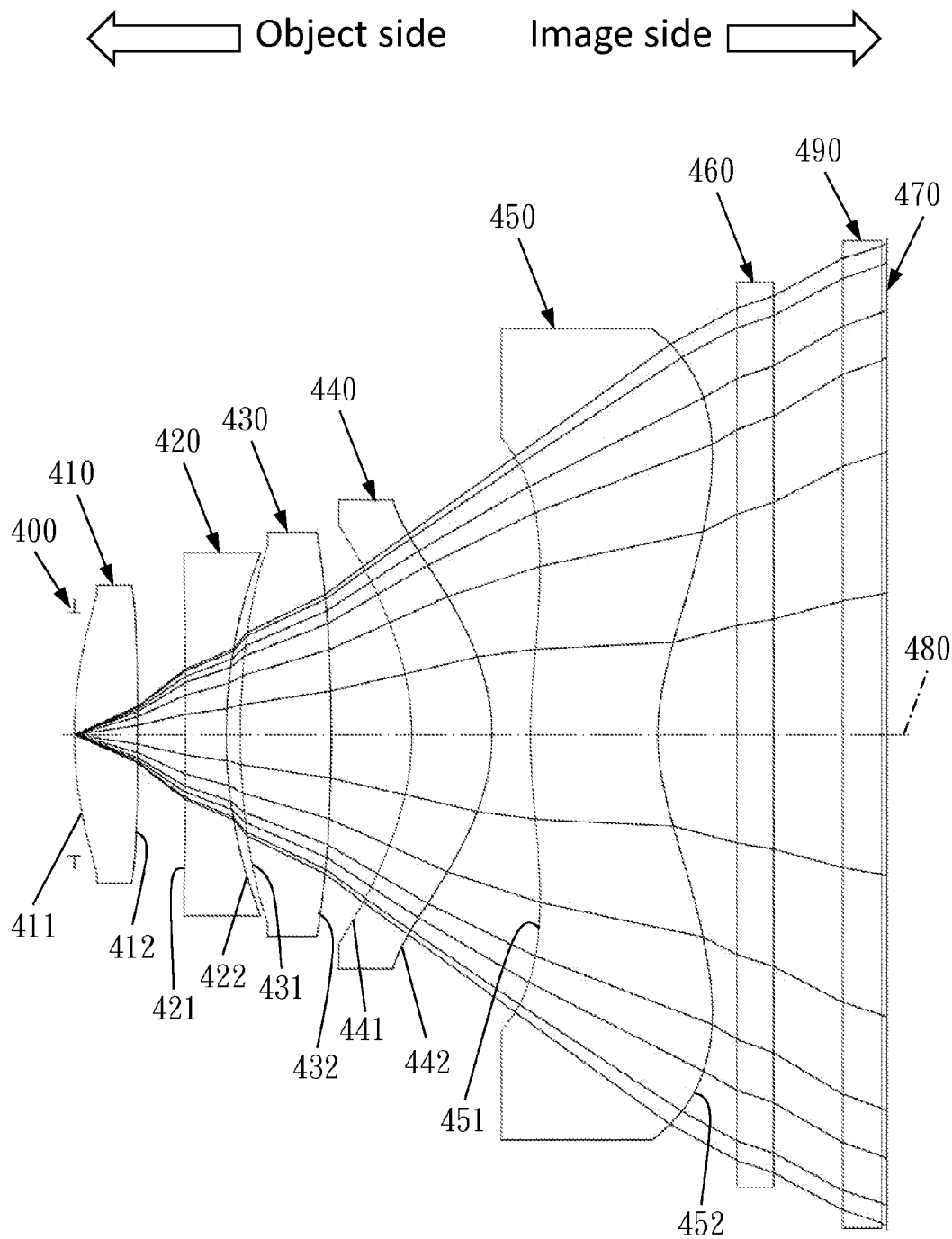
FIG. 4A shows an optical lens system in accordance with a fourth embodiment of the present invention.
Figure 4B:
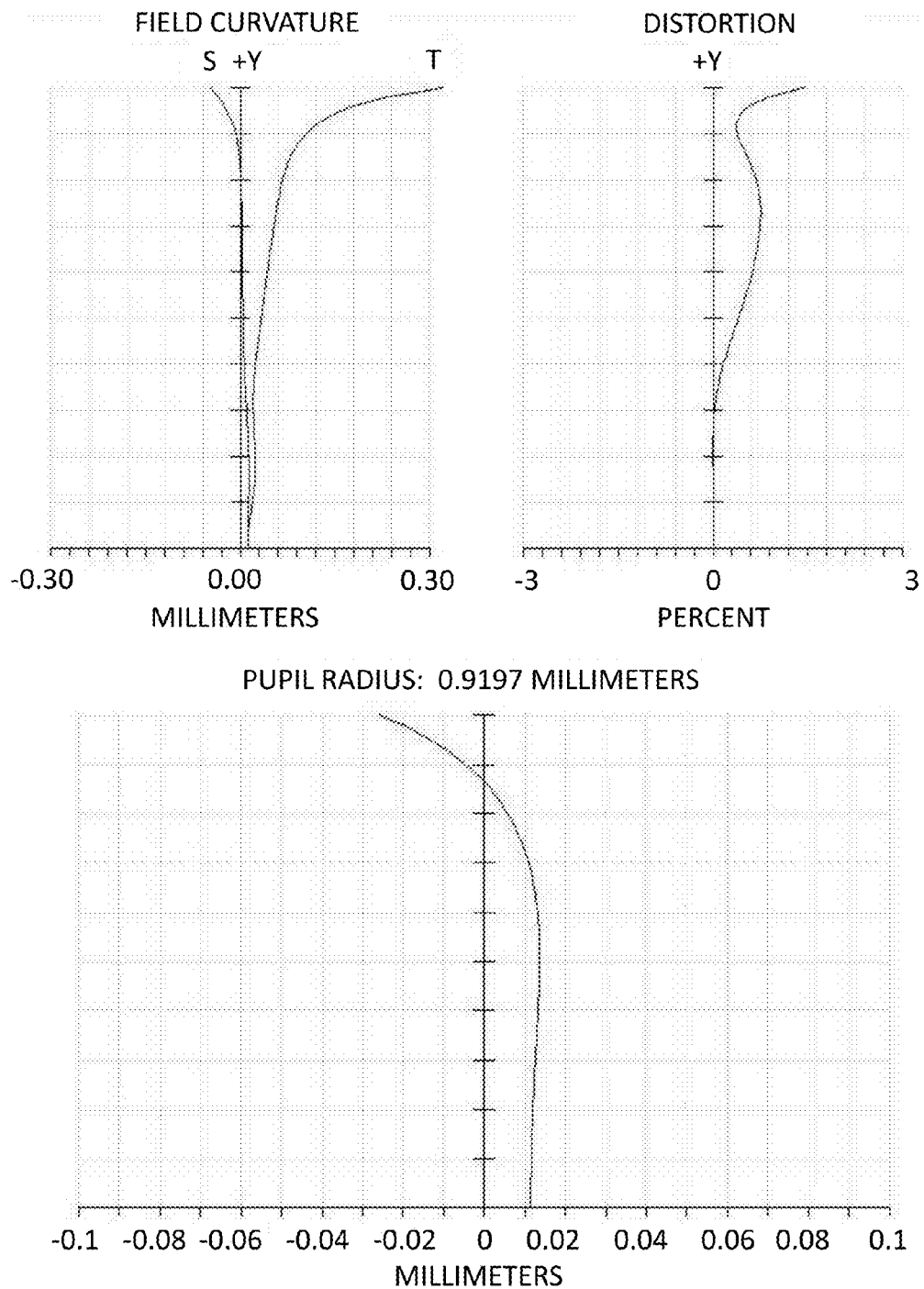
FIG. 4B shows the longitudinal spherical aberration curve, the astigmatic field curve, and the distortion curve of the fourth embodiment of the present invention.

Referring to FIG. 4A, which shows a five-piece optical lens system in accordance with a fourth embodiment of the present invention, and FIG. 4B shows the longitudinal spherical aberration curves, the astigmatic field curves, and the distortion curve of the fourth embodiment of the present invention. The fourth embodiment of the present invention comprises, in order from the object side A to the image side B:

A stop 400.

A first lens element 410 with a positive refractive power made of plastic has a convex object-side surface 411 and a convex image-side surface 412, and the object-side surface 411 and the image-side surface 412 of the first lens element 410 are aspheric.

A second lens element 420 with a negative refractive power made of plastic has a convex object-side surface 421 and a concave image-side surface 422, and the object-side surface 421 and the image-side surface 422 of the second lens element 420 are aspheric.

A third lens element 430 with a positive refractive power made of plastic has a convex object-side surface 431 and a concave image-side surface 432, and the object-side surface 431 and the image-side surface 432 of the third lens element 430 are aspheric.

A fourth lens element 440 with a positive refractive power made of plastic has a concave object-side surface 441 and a convex image-side surface 442, and the object-side surface 441 and the image-side surface 442 of the fourth lens element 440 are aspheric.

A fifth lens element 450 with a negative refractive power made of plastic has a convex object-side surface 451 and a concave image-side surface 452, and the object-side surface 451 and the image-side surface 452 of the fifth lens element 450 are aspheric.

An IR cut filter 460 made of glass is located between the image-side surface 452 of the fifth lens element 450 and an image plane 470 and has no influence on the focal length of the optical lens system.

A cover glass 490 made of glass is located between the IR cut filter 460 and the image plane 470 to protect a sensor (not shown), and has no influence on the focal length of the five-piece optical lens system.

The equation for the aspheric surface profiles of the fourth embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 480;

k represents the conic constant;

c represents the reciprocal of the radius of curvature;

A, B, C, D, E, G, . . . : represent the high-order aspheric coefficients.

In the fourth embodiment of the present five-piece optical lens system, the focal length of the five-piece optical lens system is f, and it satisfies the relation:

$f$=5.06.

In the fourth embodiment of the present five-piece optical lens system, the f-number of the five-piece optical lens system is Fno, and it satisfies the relation:

$Fno$=2.8.

In the fourth embodiment of the present five-piece optical lens system, the field of view of the five-piece optical lens system is 2ω, and it satisfies the relation:

2ω=70°.

In the fourth embodiment of the present five-piece optical lens system, the refractive index of the second lens element 420 is N2, the Abbe number of the second lens element 420 is V2, and they satisfy the relations:

N2=1.607;

V2=27.

In the fourth embodiment of the present five-piece optical lens system, the focal length of the first lens element 410 is f1, the focal length of the second lens element 420 is f2, and they satisfy the relation:

|f1|/|f2|=0.8434.

In the fourth embodiment of the present five-piece optical lens system, the focal length of the second lens element 420 is f2, the focal length of the third lens element 430 is f3, and they satisfy the relation:

|f2|/|f3|=0.8238.

In the fourth embodiment of the present five-piece optical lens system, the focal length of the third lens element 430 is f3, the focal length of the fourth lens element 440 is f4, and they satisfy the relation:

|f3|/|f4|=1.0301.

In the fourth embodiment of the present five-piece optical lens system, the focal length of the fourth lens element 440 is f4, the focal length of the fifth lens element 450 is f5, and they satisfy the relation:

|f4|/|f5|=1.2249.

In the fourth embodiment of the present five-piece optical lens system, the focal length of the first lens element 410 is f1, the focal length of the second lens element 420, the third lens element 430, the fourth lens element 440 and the fifth lens element 450 combined is f2345, and they satisfy the relation:

|f1|/|f2345|=0.1992.

In the fourth embodiment of the present five-piece optical lens system, the focal length of the first lens element 410 and the second lens element 420 combined is f12, the focal length of the third lens element 430, the fourth lens element 440 and the fifth lens element 450 combined is f345, and they satisfy the relation:

|f12|/|f345|=2.3910.

In the fourth embodiment of the present five-piece optical lens system, the focal length of the first lens element 410, the second lens element 420 and the third lens element 430 combined is f123, the focal length of the fourth lens element 440 and the fifth lens element 450 combined is f45, and they satisfy the relation:

|f123|/|f45|=0.0688.

In the fourth embodiment of the present five-piece optical lens system, the focal length of the five-piece optical lens system is f, the distance between the object-side surface 411 of the first lens element 410 and the image plane 470 is TL, and they satisfy the relation:

|f/TL|=0.7617.

The detailed optical data of the fourth embodiment is shown in table 7, and the aspheric surface data is shown in table 8, wherein the units of the radius of curvature, the thickness and the focal length are expressed in mm. In the tables 7 and 8, the surfaces 2 and 3 represent the object-side surface 411 and the image-side surface 412 of the first lens element 410, respectively, the surfaces 4 and 5 represent the object-side surface 421 and the image-side surface 422 of the second lens element 420, respectively, the surfaces 6 and 7 represent the object-side surface 431 and the image-side surface 432 of the third lens element 430, respectively, the surfaces 8 and 9 represent the object-side surface 441 and the image-side surface 442 of the fourth lens element 440, respectively, and the surfaces 10 and 11 represent the object-side surface 451 and the image-side surface 452 of the fifth lens element 450, respectively.

TABLE 7

(Embodiment 4)
f(focal length) = 5.06 mm, Fno = 2.8, 2ω = 70°.

| Surface # | | Curvature Radius | Thickness | Material | nd | vd |
|---|---|---|---|---|---|---|
| 0 | Object | Infinity | Infinity | | | |
| 1 | Stop | Infinity | 0 | | | |
| 2 | Lens 1 | 2.83374(ASP) | 0.516371 | Plastic | 1.535 | 56 |
| 3 | | −33.5741(ASP) | 0.390597 | | | |
| 4 | Lens 2 | 191.8077(ASP) | 0.334781 | Plastic | 1.607 | 27 |
| 5 | | 3.482144(ASP) | 0.11527 | | | |
| 6 | Lens 3 | 5.366991(ASP) | 0.742505 | Plastic | 1.535 | 57 |
| 7 | | −12.1643(ASP) | 0.66271 | | | |
| 8 | Lens 4 | −1.90714(ASP) | 0.656841 | Plastic | 1.531 | 56 |
| 9 | | −1.40164(ASP) | 0.315902 | | | |
| 10 | Lens 5 | 4.063234(ASP) | 1.041432 | Plastic | 1.531 | 56 |
| 11 | | 1.563888(ASP) | 0.645652 | | | |
| 12 | IR-filter | Infinity | 0.3 | Glass | 1.5168 | 64.167336 |
| 13 | | Infinity | 0.566297 | | | |
| 14 | Cover | Infinity | 0.318664 | Glass | 1.5168 | 64.167336 |
| 15 | Glass | Infinity | 0.041506 | | | |
| 16 | Image | Infinity | | | | |

TABLE 8

Aspheric Coefficients

| Surface # | 2 | 3 | 4 | 5 | 6 |
|---|---|---|---|---|---|
| k = | −1.21071 | 753.2901 | −1037.23 | −0.15723 | 6.331358 |
| A = | −0.00085 | −0.00658 | −0.01001 | −0.00012 | 3.70E−07 |
| B = | −0.00368 | −0.00041 | 0.000148 | −0.00045 | −4.52E−08 |
| C = | −0.00067 | −0.00285 | 0.001259 | 0.000214 | 5.77E−07 |
| D = | −0.00238 | −0.0011 | −3.56E−05 | 0.00016 | 5.18E−07 |

| Surface # | 7 | 8 | 9 | 10 | 11 |
|---|---|---|---|---|---|
| k = | 37.21635 | −0.63993 | −0.87743 | −33.4635 | −5.51178 |
| A = | −3.22E−09 | 0.012823 | 0.018622 | −0.02305 | −0.01904 |
| B = | 3.33E−06 | 0.001158 | 0.004339 | 0.000974 | 0.002127 |
| C = | 7.27E−07 | 0.000554 | 0.000201 | 0.000294 | −0.0002 |
| D = | 3.23E−08 | −0.0002 | 0.000113 | −8.20E−05 | 4.00E−06 |

TABLE 9

| | Embodiment 1 | Embodiment 2 | Embodiment 3 | Embodiment 4 |
|---|---|---|---|---|
| f | 3.69 | 2.86 | 5.63 | 5.06 |
| Fno | 2.2 | 2.4 | 2.8 | 2.8 |
| 2ω | 75 | 90 | 68 | 70 |
| N2 | 1.632 | 1.632 | 1.607 | 1.607 |
| V2 | 23 | 23 | 27 | 27 |
| \|f1\|/\|f2\| | 0.5141 | 0.5715 | 0.6079 | 0.8434 |
| \|f2\|/\|f3\| | 1.8163 | 1.0748 | 0.6935 | 0.8238 |
| \|f3\|/\|f4\| | 0.2049 | 0.0627 | 0.2579 | 1.0301 |
| \|f4\|/\|f5\| | 3.9554 | 5.4373 | 3.8177 | 1.2249 |
| \|f1\|/\|f2345\| | 0.5012 | 0.0890 | 0.7966 | 0.1992 |
| \|f12\|/\|f345\| | 0.1175 | 0.8478 | 0.1362 | 2.3910 |
| \|f123\|/\|f45\| | 0.9422 | 0.2889 | 0.7710 | 0.0688 |
| \|f/TL\| | 0.7432 | 0.6526 | 0.8014 | 0.7617 |

It is to be noted that the tables 1-8 show different data from the different embodiments, however, the data of the different embodiments is obtained from experiments. Therefore, any product of the same structure is deemed to be within the scope of the present invention even if it uses different data. Table 9 lists the relevant data for the various embodiments of the present invention.

In the present five-piece optical lens system, the lens elements can be made of glass or plastic. If the lens elements are made of glass, there is more freedom in distributing the refractive power of the five-piece optical lens system. If the lens elements are made of plastic, the cost will be effectively reduced.

In the present five-piece optical lens system, if the object-side or the image-side surface of the lens elements is convex, the object-side or the image-side surface of the lens elements in proximity of the optical axis is convex. If the object-side or the image-side surface of the lens elements is concave, the object-side or the image-side surface of the lens elements in proximity of the optical axis is concave.

While we have shown and described various embodiments in accordance with the present invention, it should be clear to those skilled in the art that further embodiments may be made without departing from the scope of the present invention.

What is claimed is:

1. A five-piece optical lens system comprising, in order from an object side to an image side:
   a stop;
   a first lens element with a positive refractive power having a convex image-side surface, at least one of an object-side and the image-side surfaces of the first lens element being aspheric;
   a second lens element with a negative refractive power having a concave image-side surface, at least one of an object-side and the image-side surfaces of the second lens element being aspheric;
   a third lens element with a positive refractive power having a convex image-side surface, at least one of an object-side and the image-side surfaces of the third lens element being aspheric;
   a fourth lens element having a concave object-side surface, at least one of the object-side and an image-side surfaces of the fourth lens element being aspheric; and
   a fifth lens element with a negative refractive power having a convex image-side surface, at least one of an object-side and the image-side surfaces of the fifth lens element being aspheric;
   wherein a focal length of the second lens element is f2, a focal length of the third lens element is f3, and they satisfy the relation:

$1.5 < |f2|/|f3| < 2.2$.

2. The five-piece optical lens system as claimed in claim 1, wherein a focal length of the first lens element is f1, a focal length of the second lens element is f2, and they satisfy the relation:

$0.3 < |f1|/|f2| < 1.0$.

3. The five-piece optical lens system as claimed in claim 1, wherein a focal length of the third lens element is f3, a focal length of the fourth lens element is f4, and they satisfy the relation:

$|f3|/|f4|1.2$.

4. The five-piece optical lens system as claimed in claim 1, wherein a focal length of the fourth lens element is f4, a focal length of the fifth lens element is f5, and they satisfy the relation:

$1.0 < |f4|/|f5| < 5.5$.

5. The five-piece optical lens system as claimed in claim 1, wherein a refractive index of the second lens element is N2, an Abbe number of the second lens element is V2, and they satisfy the relations:

$N2 > 1.57$;

$V2 < 40$.

6. The five-piece optical lens system as claimed in claim 1, wherein a focal length of the first lens element is f1, a focal length of the second lens element, the third lens element, the fourth lens element and the fifth lens element combined is f2345, and they satisfy the relation:

$$|f1|/|f2345|<1.1.$$

7. The five-piece optical lens system as claimed in claim 1, wherein a focal length of the first lens element and the second lens element combined is f12, a focal length of the third lens element, the fourth lens element and the fifth lens element combined is f345, and they satisfy the relation:

$$|f12|/|f345|<2.5.$$

8. The five-piece optical lens system as claimed in claim 1, wherein a focal length of the first lens element, the second lens element and the third lens element combined is f123, a focal length of the fourth lens element and the fifth lens element combined is f45, and they satisfy the relation:

$$|f123|/|f45|<1.2.$$

9. The five-piece optical lens system as claimed in claim 1, wherein a focal length of the five-piece optical lens system is f, a distance between the object-side surface of the first lens element and the image plane is TL, and they satisfy the relation:

$$0.5<|f/TL|<0.9.$$

10. The five-piece optical lens system as claimed in claim 1, wherein the first, second, third, fourth and fifth lens elements are made of plastic, the object-side surface of the first lens element is convex, the object-side surface and the image-side surface of the first lens element are aspheric, the object-side surface of the second lens element is convex, the object-side surface and the image-side surface of the second lens element are aspheric, the object-side surface of the third lens element is concave, the object-side surface and the image-side surface of the third lens element are aspheric, the image-side surface of the fourth lens element is convex, the object-side surface and the image-side surface of the fourth lens element are aspheric, the image-side surface of the fifth lens element is concave, and the object-side surface and the image-side surface of the fifth lens element are aspheric.

11. The five-piece optical lens system as claimed in claim 1, wherein the first, second, third, fourth and fifth lens elements are made of plastic, the object-side surface of the first lens element is convex, the object-side surface and the image-side surface of the first lens element are aspheric, the object-side surface of the second lens element is concave, the object-side surface and the image-side surface of the second lens element are aspheric, the object-side surface of the third lens element is concave, the object-side surface and the image-side surface of the third lens element are aspheric, the image-side surface of the fourth lens element is convex, the object-side surface and the image-side surface of the fourth lens element are aspheric, the image-side surface of the fifth lens element is concave, and the object-side surface and the image-side surface of the fifth lens element are aspheric.

12. The five-piece optical lens system as claimed in claim 1, wherein the first, second, third, fourth and fifth lens elements are made of plastic, the object-side surface of the first lens element is convex, the object-side surface and the image-side surface of the first lens element are aspheric, the object-side surface of the second lens element is convex, the object-side surface and the image-side surface of the second lens element are aspheric, the object-side surface of the third lens element is convex, the object-side surface and the image-side surface of the third lens element are aspheric, the image-side surface of the fourth lens element is convex, the object-side surface and the image-side surface of the fourth lens element are aspheric, the image-side surface of the fifth lens element is concave, and the object-side surface and the image-side surface of the fifth lens element are aspheric.

* * * * *

UNITED STATES PATENT AND TRADEMARK OFFICE
CERTIFICATE OF CORRECTION

PATENT NO. : 8,547,649 B2  Page 1 of 1
APPLICATION NO. : 13/339360
DATED : October 1, 2013
INVENTOR(S) : Shu-Tzu Lai It is certified that error appears in the above-identified patent and that said Letters Patent is hereby corrected as shown below:

Title Page, Item 57 Abstract, line 14:

convex image-side should be convex object-side

In the Claims:

Column 18, claim 1, line 30:

convex image-side should be convex object-side

Signed and Sealed this
Seventh Day of January, 2014

Margaret A. Focarino
*Commissioner for Patents of the United States Patent and Trademark Office*